United States Patent [19]

Zenda

[11] Patent Number: 5,592,187
[45] Date of Patent: *Jan. 7, 1997

[54] PLASMA DISPLAY CONTROL SYSTEM

[75] Inventor: Hiroki Zenda, Hamura-machi, Japan

[73] Assignee: Kabushiki Kaisha Toshiba, Kawasaki, Japan

[*] Notice: The term of this patent shall not extend beyond the expiration date of Pat. No. 5,396,258.

[21] Appl. No.: 326,808

[22] Filed: Oct. 19, 1994

Related U.S. Application Data

[63] Continuation of Ser. No. 88,332, Jul. 9, 1993, abandoned, which is a continuation of Ser. No. 789,537, Nov. 8, 1991, Pat. No. 5,396,258, which is a continuation of Ser. No. 355,615, May 23, 1989, abandoned.

[30] Foreign Application Priority Data

May 28, 1988  [JP]  Japan ................................. 63-130923

[51] Int. Cl.⁶ ............................................. G09G 5/00
[52] U.S. Cl. .................................. 345/3; 345/213
[58] Field of Search ....................... 345/1, 2, 3, 98–100, 345/212, 213, 179; 348/511, 588, 792

[56] References Cited

U.S. PATENT DOCUMENTS

| | | |
|---|---|---|
| 4,536,793 | 8/1985 | Harshbarger et al. . |
| 4,536,856 | 8/1985 | Hiroishi ................................. 340/716 |
| 4,611,203 | 9/1986 | Criscimagna . |
| 4,662,718 | 5/1987 | Masubuchi . |
| 4,684,936 | 8/1987 | Brown . |
| 4,727,362 | 2/1988 | Rackley et al. ........................ 340/703 |
| 4,730,186 | 3/1988 | Koga et al. ............................ 345/179 |
| 4,748,510 | 5/1988 | Umezawa ............................... 348/792 |
| 4,760,387 | 7/1988 | Ishii et al. ............................. 340/717 |
| 4,769,640 | 9/1988 | Sato . |
| 4,779,132 | 10/1988 | McBeath et al. ...................... 358/148 |
| 4,855,728 | 8/1989 | Mano et al. ........................... 340/805 |
| 4,860,246 | 8/1989 | Inoue .................................... 340/717 |
| 4,891,705 | 1/1990 | Suzuki et al. ......................... 345/115 |
| 4,922,448 | 5/1990 | Kunieda et al. ......................... 345/1 |
| 4,926,166 | 5/1990 | Fujisawa et al. ...................... 340/814 |
| 5,396,258 | 3/1995 | Zenda ....................................... 345/3 |

FOREIGN PATENT DOCUMENTS

| | | |
|---|---|---|
| 2090506 | 7/1982 | United Kingdom . |
| 2179185A | 2/1987 | United Kingdom . |

OTHER PUBLICATIONS

"Raster CRT Controller to Drive a Plasma Panel," IBM Technical Bulletin, vol. 29, No. 4 (Sep. 1986).
Pegaz, Users Guide, Paradise System, inc. pp. 1–61; 1986.

*Primary Examiner*—Steven Saras
*Attorney, Agent, or Firm*—Finnegan, Henderson, Farabow, Garrett & Dunner, L.L.P.

[57] ABSTRACT

A vertical sync signal and a back porch period following the vertical sync signal are detected by a back porch period detecting circuit. A display period setting circuit sets the effective display period on the basis of the back porch period. A display drive means display-drives the plasma display on the basis of the display period, thereby enabling driving a plasma display at a display timing of a CRT display.

13 Claims, 13 Drawing Sheets

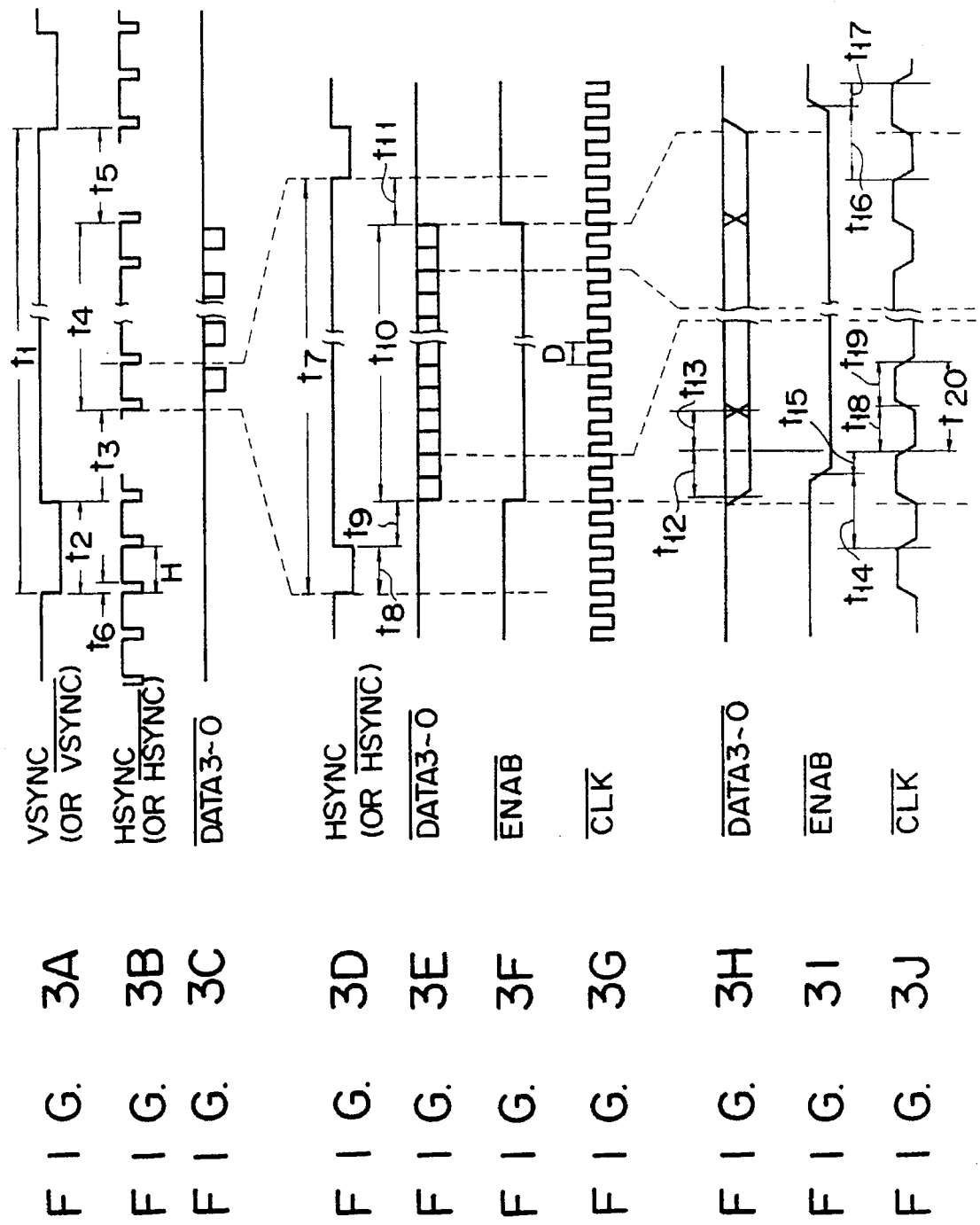

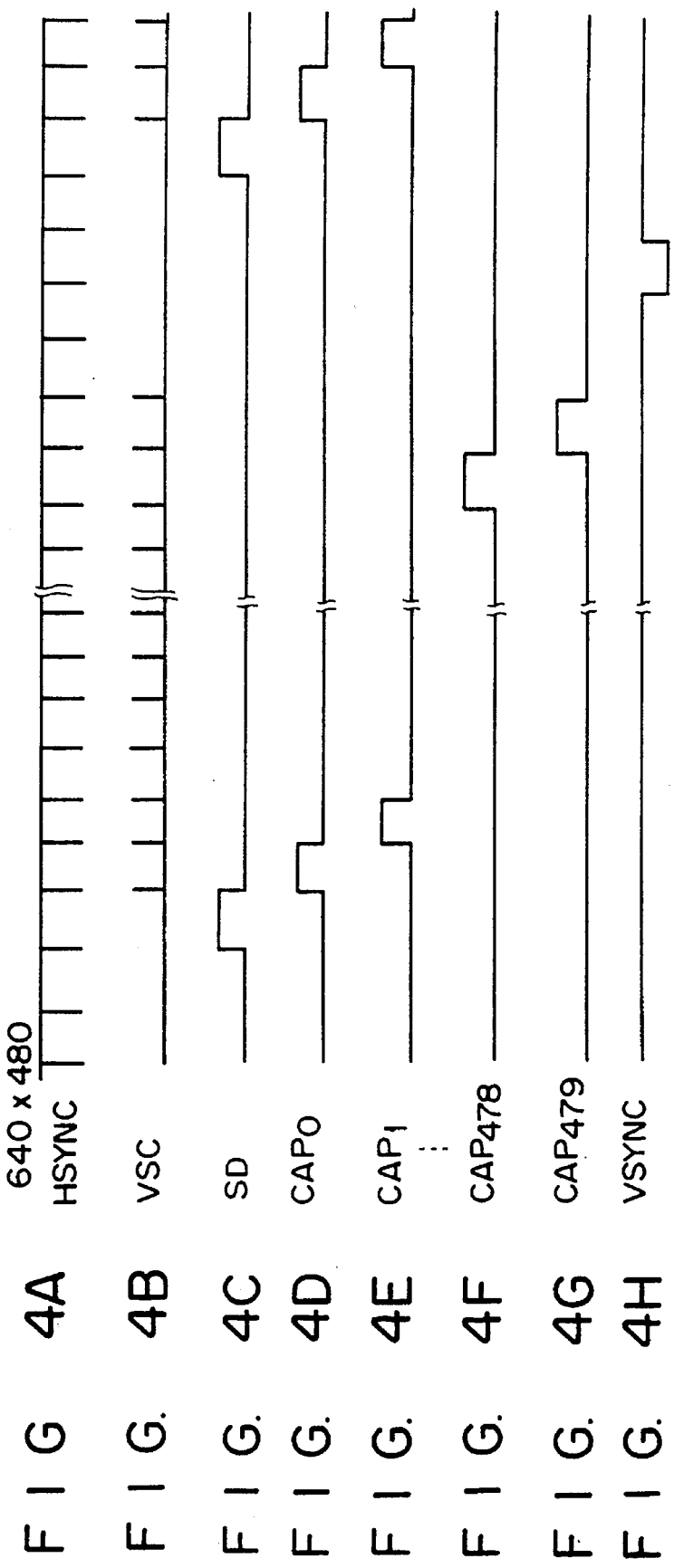

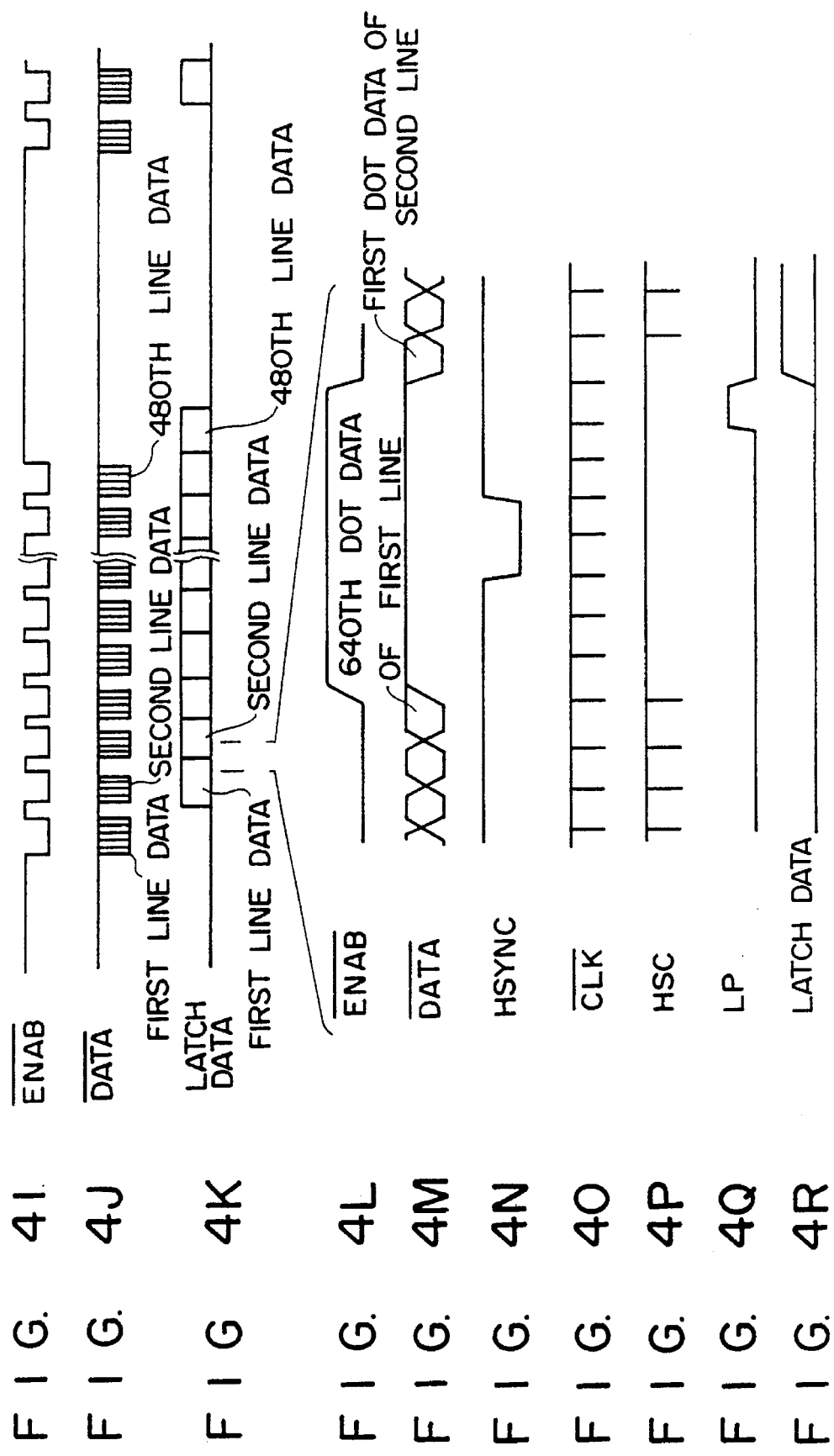

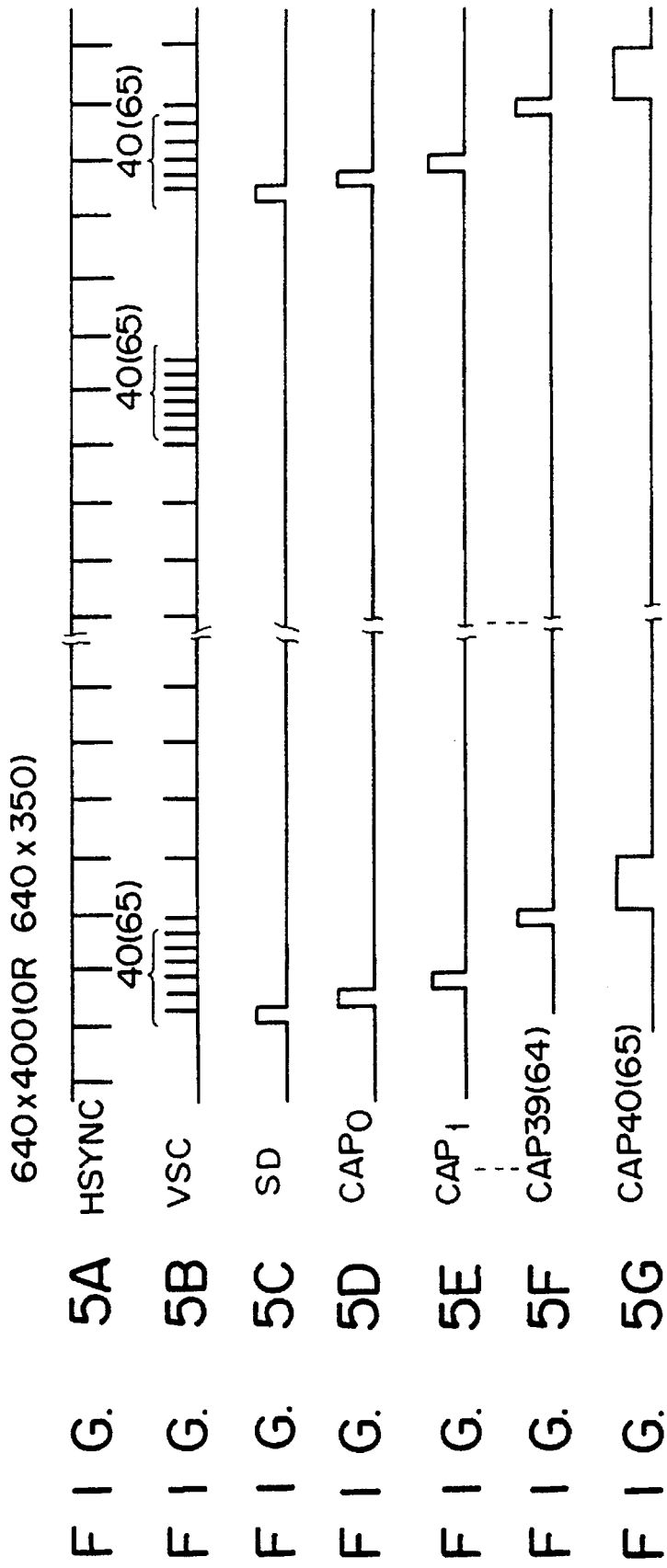

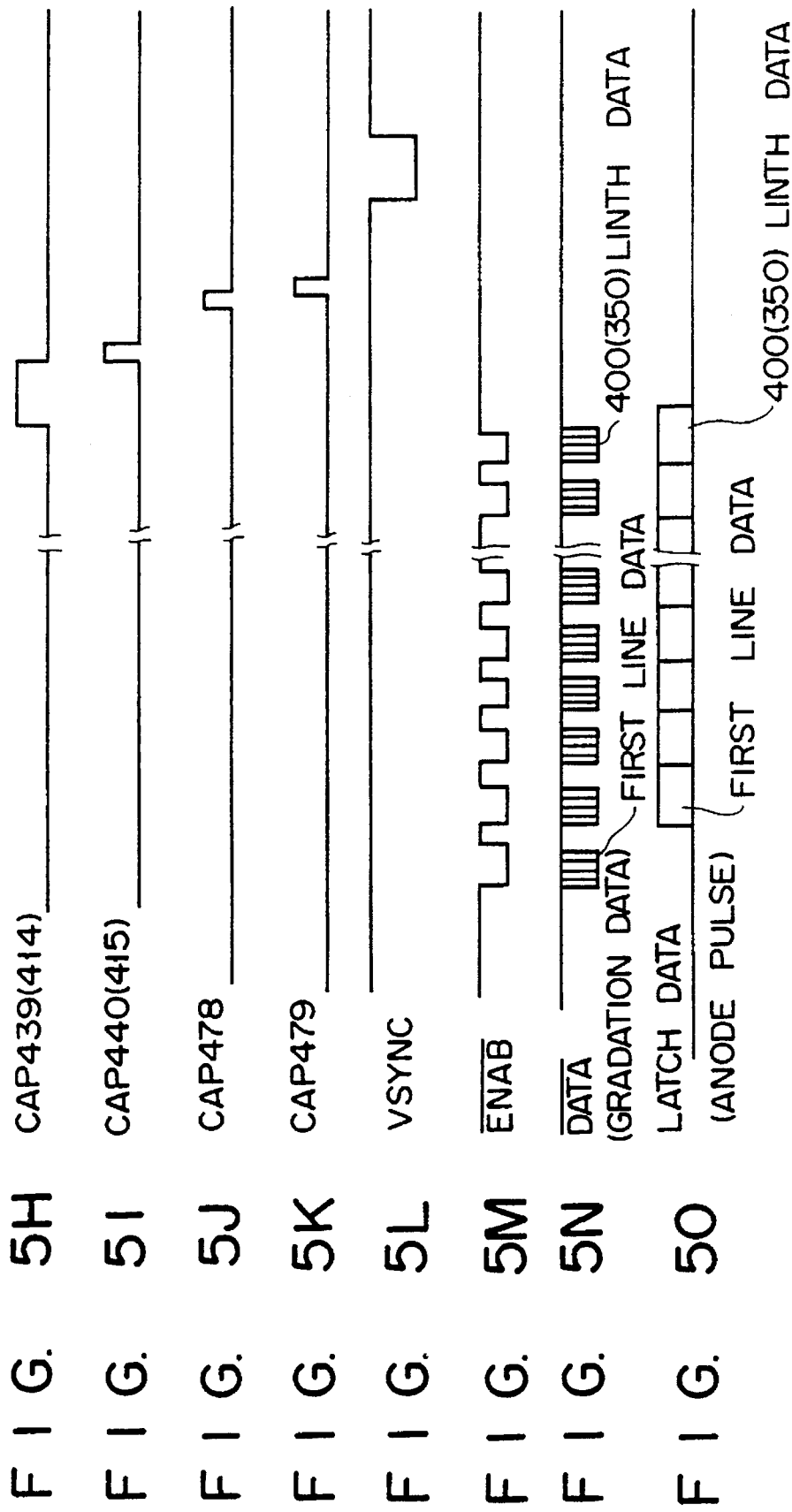

|  | 640 x 480 | 640 x 400 | 640 x 350 |
|---|---|---|---|
| VSYNC POLARITY | NEGATIVE | POSITIVE | NEGATIVE |
| HSYNC POLARITY | NEGATIVE | NEGATIVE | POSITIVE |
| t1 | 16.683ms(525H) | 14.268ms(449H) | 14.268ms(449H) |
| t2 | 0.064ms( 2H) | 0.064ms( 2H) | 0.064ms( 2H) |
| t3 | 1.017ms( 32H) | 1.080ms( 34H) | 1.875ms( 59H) |
| t4 | 15.253ms(480H) | 12.711ms(400H) | 11.122ms(350H) |
| t5 | 0.350ms( 11H) | 0.413ms( 13H) | 1.208ms( 38H) |
| t6 | 3.813ms( 96D) | 3.813ms( 96D) | 3.813ms( 96D) |
| t7 (=1H) | 31.778ms(800D) | 31.778ms(800D) | 31.778ms(800D) |
| t8 | 3.813ms( 96D) | 3.813ms( 96D) | 3.813ms( 96D) |
| t9 | 1.907ms( 48D) | 1.907ms( 48D) | 1.907ms( 48D) |
| t10 | 25.422ms(640D) | 25.422ms(640D) | 25.422ms(640D) |
| t11 | 0.636ms( 16D) | 0.636ms( 16D) | 0.636ms( 16D) |

FIG. 6

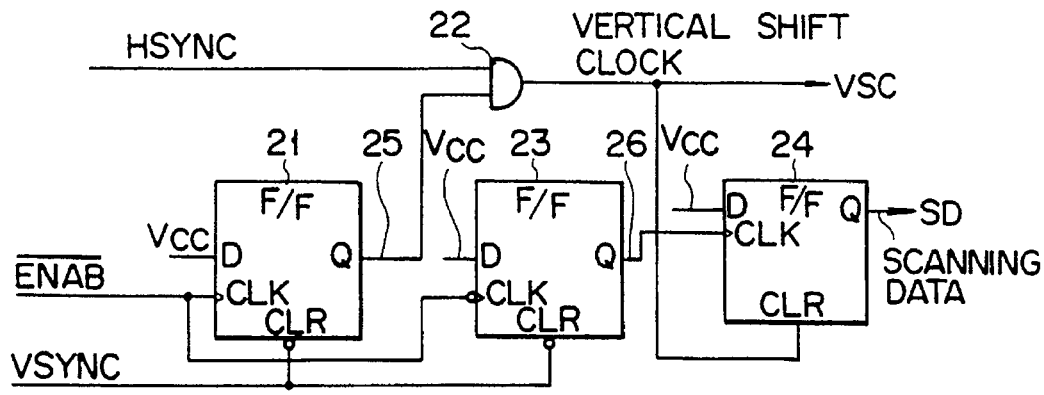
FIG. 8
| | | |
|---|---|---|
| FIG. 9A | HSYNC | |
| FIG. 9B | VSYNC | |
| FIG. 9C | ENAB | |
| FIG. 9D | F/F21 OUTPUT(25) | |
| FIG. 9E | VSC (VERTICAL SHIFT CLOCK) | |
| FIG. 9F | F/F23 OUTPUT(26) | |
| FIG. 9G | SD (SCANNING DATA) | |
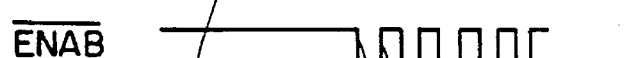

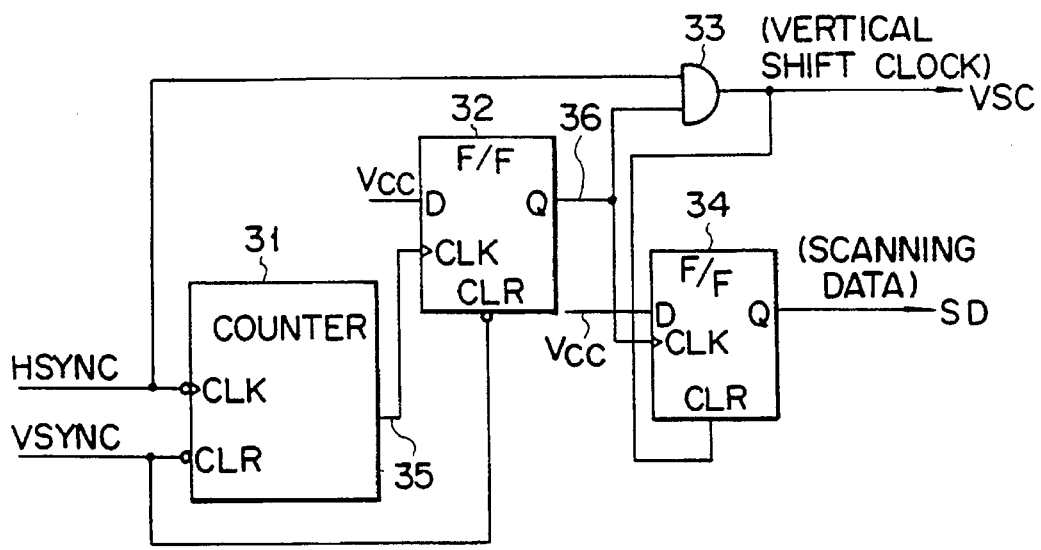
FIG. 10
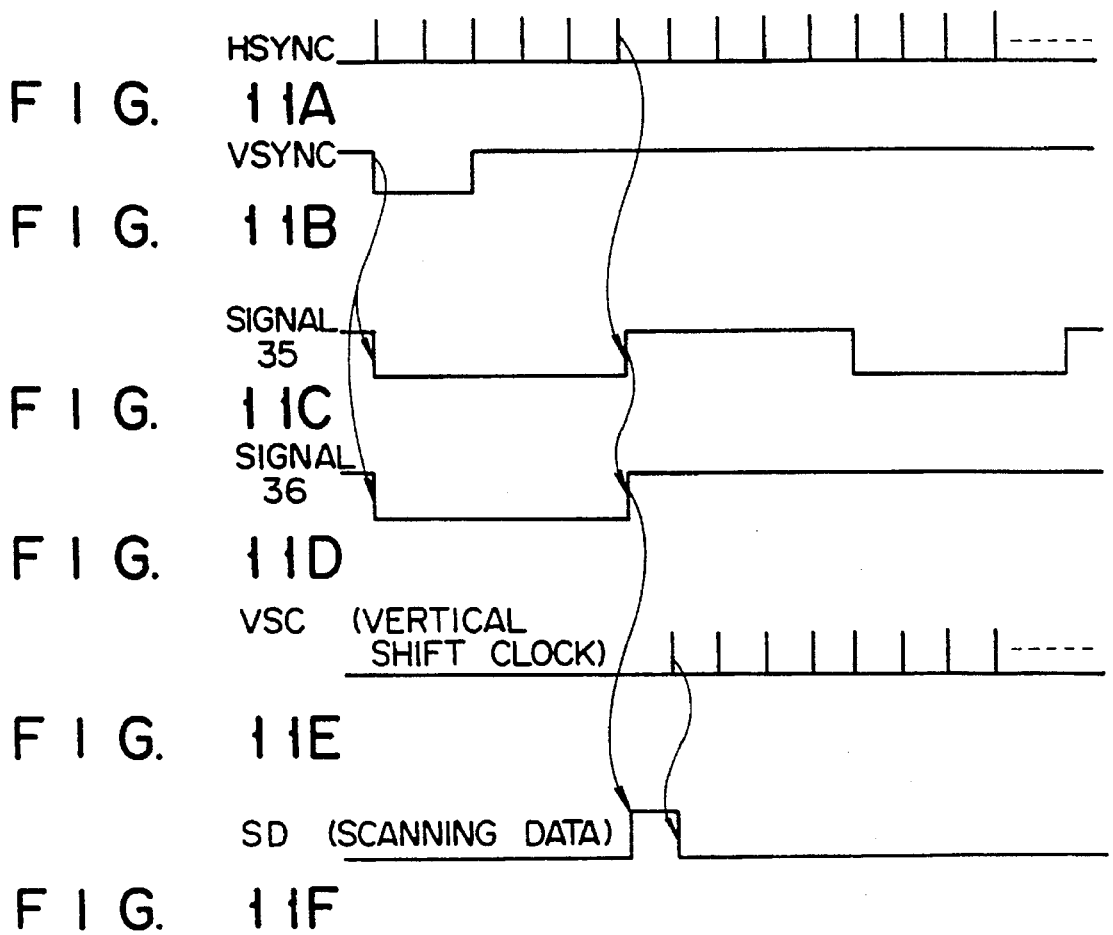
FIG. 11A
FIG. 11B
FIG. 11C
FIG. 11D
FIG. 11E
FIG. 11F

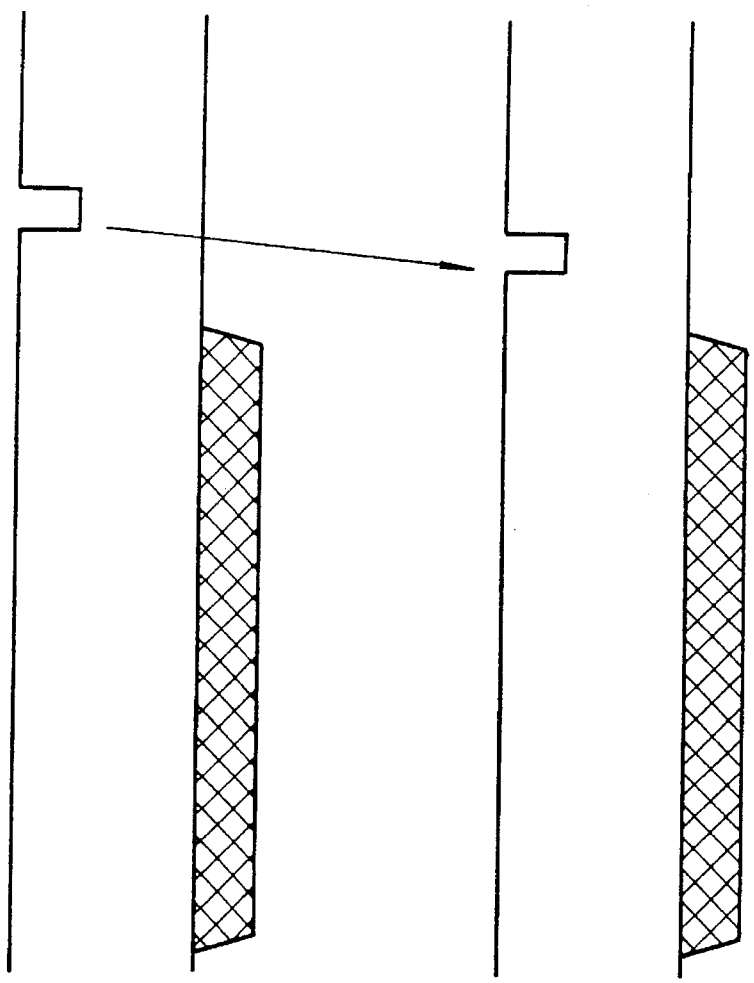

PLASMA DISPLAY CONTROL SYSTEM

This application is a continuation of application Ser. No. 08/088,332, filed Jul. 9, 1993, now abandoned, which is a continuation of Ser. No. 07/789,537, filed Nov. 8, 1991, now U.S. Pat. No. 5,396,258, which is a continuation of Ser. No. 07/355,615, filed May 23, 1989, now abandoned.

BACKGROUND OF THE INVENTION

1. Field of the Invention

The present invention relates to a plasma display control system for driving a plasma display at the display timing of a CRT display.

2. Description of the Related Art

In general, in display control of a CRT display, a vertical blanking period (0.0008 sec to 0.0013 sec) including a vertical sync signal and front and back porches at the beginning and end of this signal is necessary. On the other hand, in display control of a plasma display, the above-mentioned long vertical blanking period is not required. Therefore, the plasma display and the CRT display have a different display timing for display drive control. Therefore, in a laptop type personal computer which has a plasma display and a CRT display which can be connected as an external device, a display timing circuit is required to control the plasma display and the display timing circuit must also drive the CRT display. Furthermore, a switching circuit for switching the display timings is also required, resulting in a complex arrangement.

In the CRT display, since a front (1.27 μsec) and a back porch (3.81 μsec) must be large to provide a display margin so that if a frame is offset slightly (by several characters) in a horizontal or vertical direction, the entire frame can still be displayed.

On the other hand, since the plasma display has no display margin, when the identical frame is displayed using the same display timing as the CRT display, the frame will be partially omitted and is not displayed on the plasma display.

SUMMARY OF THE INVENTION

It is an object of the present invention to provide a plasma display control system which can display-control a plasma display using the same display timing as for the CRT display.

It is another object of the present invention to provide a plasma display control system wherein when an identical frame is displayed at the same display timing as a CRT display, even if the frame is offset by several characters in the horizontal or vertical direction on the CRT display, the entire frame can be accurately displayed on the plasma display.

In order to achieve the above objects, according to the present invention, a display control system for a plasma display having a CRT controller, which includes a plasma display with an optional connection for a CRT display. The CRT controller drives and electrically controls the plasma display and the CRT display and comprises back porch period detection means used to display timing control of the CRT display for detecting a vertical sync signal and a back porch period following the vertical sync signal; display period setting means for setting an effective display period on the basis of the back porch period detected by the back porch period detection means; and display drive means for driving the plasma display on the basis of the display period set by the display period setting means.

According to the present invention, in a personal computer which comprises a plasma display and allows for a CRT display to be connected thereto, an arrangement of the display control can be simplified to provide economical advantages. Display software (e.g., BIOS and application software) created for the CRT display can be used for the plasma display without any modifications.

BRIEF DESCRIPTION OF THE DRAWINGS

Other objects and features of the present invention will be apparent from the following description taken in connection with the accompanying drawings, in which:

FIGS. 3A through 3J are timing charts showing various signals supplied to the plasma display shown in FIG. 2;

FIGS. 4A through 4R are timing charts showing signal states of respective portions in a plasma display having a display resolution of 640×480 dots;

FIGS. 5A through 5O are timing charts showing signal states of respective portions of a plasma display having a display resolution of 640×400 dots (or 640×350 dots);

FIG. 6 is a table showing the relationship between polarities of a vertical sync signal (VSYNC) and a horizontal sync signal (HSYNC) supplied to a mode discrimination/clock generator 15 shown in FIG. 2, and display resolutions (640×480 dots/640×400 dots/640×350 dots) discriminated on the basis of the polarity states, and signal durations of the respective portions shown in FIGS. 3A through 3J at the corresponding display resolutions;

FIG. 8 is a detailed block diagram showing an internal arrangement of the cathode timing generator shown in FIG. 2;

FIGS. 9A through 9G are timing charts showing the timing of signals supplied to respective portions of the cathode timing generator shown in FIG. 8;

FIG. 10 is a detailed block diagram showing another embodiment of the cathode timing generator shown in FIG. 2;

FIGS. 11A through 11F are timing charts showing the timing of signals at respective portions of the cathode timing generator in the block diagram shown in FIG. 10;

FIGS. 12A through 12D are views for explaining a display position offset when no display period signal (ENAB) is used in the embodiment shown in FIG. 8.

DETAILED DESCRIPTION OF THE PREFERRED EMBODIMENTS

Figure 1:
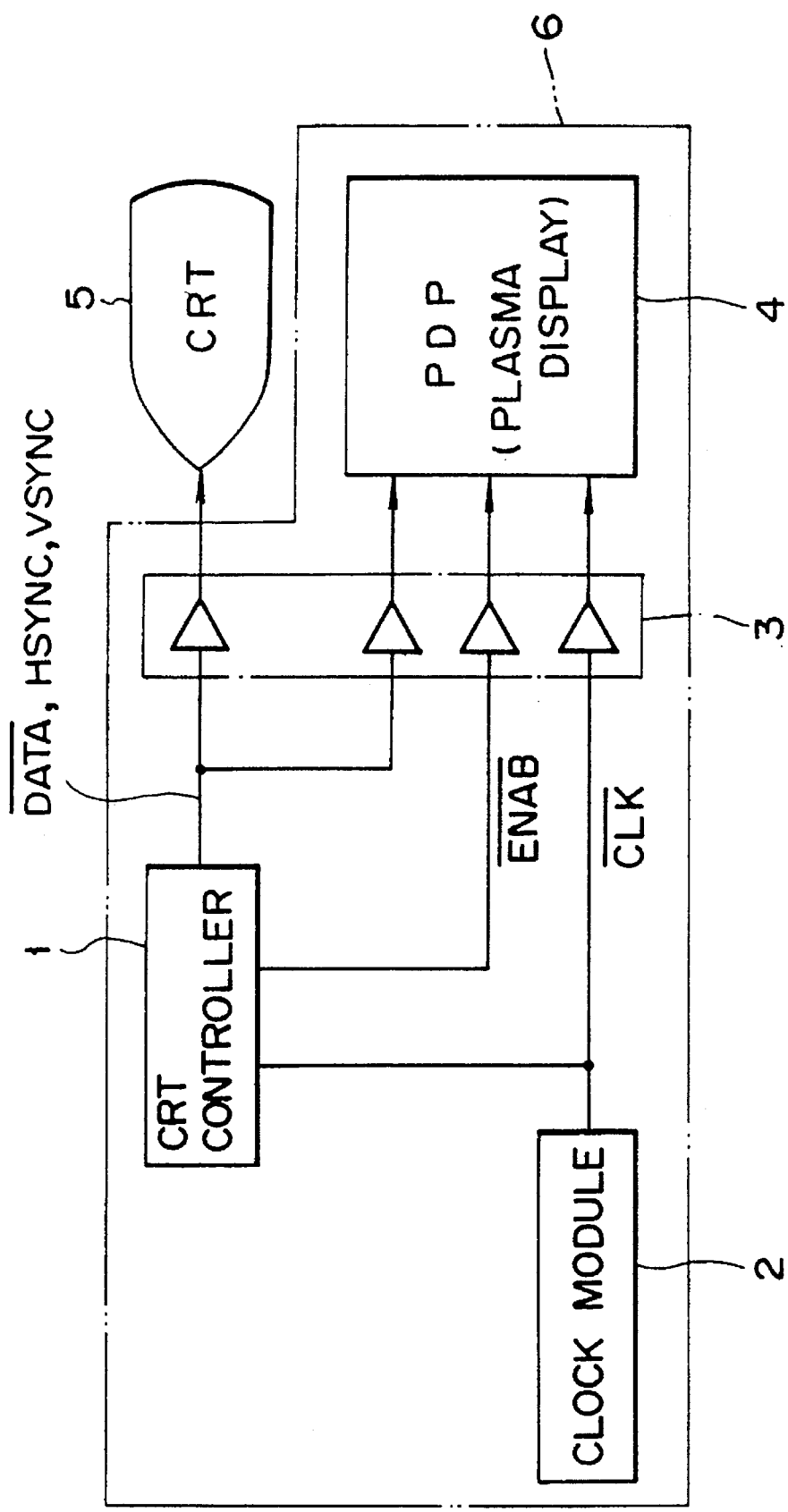
FIG. 1 is a block diagram showing the overall arrangement of a plasma display control system.

FIG. 1 is a block diagram showing the overall arrangement of a display controller according to the preferred embodiments of the present invention.

In FIG. 1, a plasma display controller 6 according to the preferred embodiments of the present invention has a CRT controller 1 which outputs various display control signals for controlling display of a cathode ray tube (CRT) 5 and a plasma display (PDP) 4. More specifically, the CRT controller 1 outputs a vertical sync signal (VSYNC), a horizontal sync signal (HSYNC), display data (DATA), and an enable signal (ENAB) indicating the output timing of display data, which are generated according to display timings of the CRT 5, to the CRT 5 and the PDP 4 through driver 3. The CRT controller 1 described above may adopt the PVGA1 available from Paradise, U.S.A. The polarities (negative/positive) of the vertical sync signal (VSYNC) and the horizontal sync signal (HSYNC) output from the CRT controller 1 are changed in accordance with display resolutions (for example 640×480 dots, 640×400 dots, and 640× 350 dots shown in FIGS. 7A through 7C in this embodiment) of the CRT 5 and the PDP 4, as shown in FIG. 6. A clock module 2 supplies a clock signal $\overline{CLK}$ to the PDP 4 through the driver 3.

Figure 2:
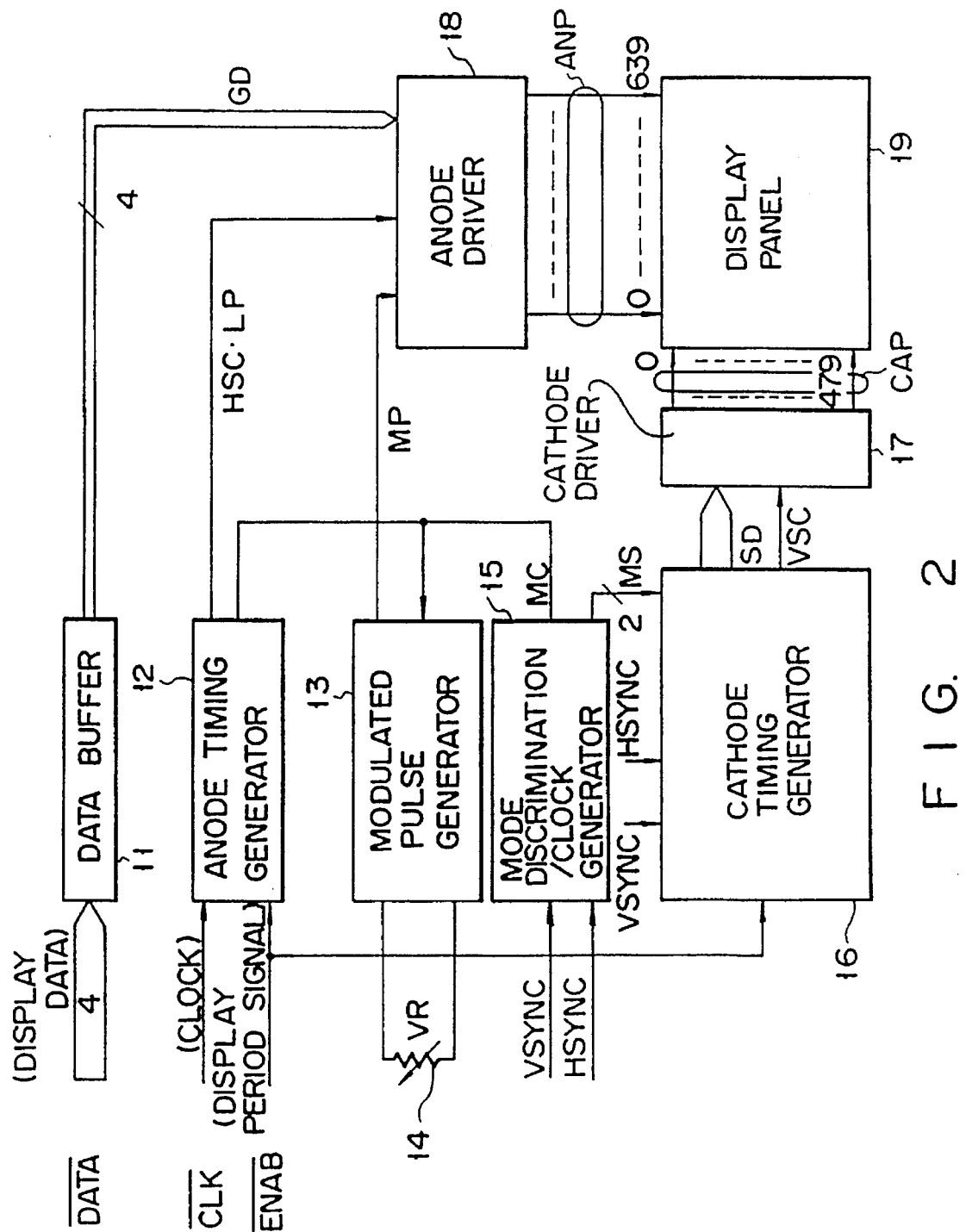
FIG. 2 is a block diagram showing an internal arrangement of the plasma display shown in FIG. 1.

FIG. 2 is a block diagram showing the internal arrangement of the PDP 4.

In FIG. 2, a data buffer 11 successively receives the display data DATA (4 bits/pixel; 16 gradation levels) supplied from the CRT controller 1, and outputs it as gradation data (GD). An anode timing generator 12 receives a clock ($\overline{CLK}$), a display period signal ($\overline{ENAB}$), and a clock (MC) from a mode discrimination/clock generator 15, and outputs a horizontal shift clock (HSC) shown in FIG. 4P, a latch pulse (LP) shown in FIG. 4Q. A modulated pulse generator 13 generates a modulated pulse (MP) on the basis of the clock (MC) generated by the mode discrimination/clock generator 15. A variable resistor 14 performs uniform luminance adjustment for the entire gradation by changing the pulse width of the modulated pulse (MP) generated from the modulated pulse generator 13. The mode discrimination/clock generator 15 determines the display resolution of a display screen on the basis of a negative/positive polarity of the vertical sync signal (VSYNC) and the horizontal sync signal (HSYNC), outputs a mode switching signal (MS), and also generates various internal clocks (MC). A cathode timing generator 16 receives the display period signal ($\overline{ENAB}$), the vertical sync signal (VSYNC), the horizontal sync signal (HSYNC), the mode switching signal (MS: 2 bits) generated from the mode discrimination/clock generator 15, and generates signals such as scanning data (SD), a vertical shift clock (VSC), for driving the cathode electrodes. A cathode driver 17 receives the scanning data (SD) and the vertical shift clock (VSC) generated from the cathode timing generator 16, and outputs cathode pulses (CAP0 through CAP479) for driving the cathode electrodes. An anode driver 18 receives the gradation data (GD) from the data buffer 11, and the horizontal shift clock (HSC) and the latch pulse (LP) from the anode timing generator 12, fetches the gradation data (GD) in its internal shift register in response to the horizontal shift clock (HSC), latches data of 640 pixels in its internal latch circuit in response to the latch pulse (LP), and performs pulse-width control in accordance with the modulated pulse (MP) to output anode pulses (ANP0 through ANP639) each having a pulse width corresponding to gradation of pixel data. A display panel 19 receives at the cathode electrodes the cathode pulses (CAP0 through CAP479) output from the cathode driver 17, also receives at the anode electrodes the anode pulses (ANP0 through ANP639), and outputs display data at a maximum display resolution of 640×480 dots (16 gradation levels).

FIGS. 3A through 3J are timing charts showing various timings of signals supplied to the PDP 4 having the internal arrangement shown in FIG. 2. In the timing charts shown in FIGS. 3A through 3J, reference symbol t1 denotes a one-frame period; t2, a vertical sync signal (VSYNC) period; t3, a vertical back porch (see VBP in FIG. 13B) included in a vertical blanking period; t7, a one-line display period; t5, a vertical front porch (see VFP in FIG. 13B) included in the vertical blanking period; t8, a horizontal sync signal (HSYNC) period; t9, a horizontal back porch (see HBP in FIG. 13B); t10, an effective display data width corresponding to the duration of the display period signal ($\overline{ENAB}$); t11, a horizontal front porch (see HFP in FIG. 13B); t4, a display time in a vertical direction (effective display period); t6, a gap between signals VSYNC and HSYNC (the time from which the VSYNC signal becomes low to the time the HSYNC signal becomes high); t12, a data setup time; t13, a data hold time; t14, an enable hold time (high to low); t15, an enable setup time (high to low); t16, an enable hold time (low to high); t17, an enable setup time (low to high); t18, a clock low time; t19, a clock high time; and t20, a clock period. FIG. 6 shows detailed durations of these signals.

Figure 7A:
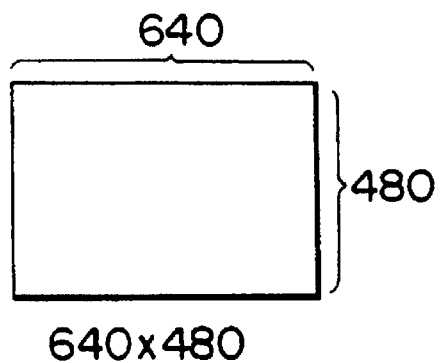
FIGS. 7A through 7C are views showing display/non-display areas at the corresponding display resolutions.

FIGS. 4A through 4R are timing charts showing signal states of respective portions in the PDP 4 having a display resolution of 640×480 dots shown in FIG. 7A. Furthermore, FIGS. 5A through 5O are timing charts showing signal states of respective portions in the PDP 4 having a display resolution of 640×400 dots shown in FIG. 7B or 640×350 dots shown in FIG. 7C. In this embodiment, the vertical shift clock (VSC) having a shorter interval than a display area is generated for upper and lower non-display areas corresponding to 40 lines of the display screen.

FIG. 6 is a table showing the relationship between polarities of the vertical sync signal (VSYNC) and the horizontal sync signal (HSYNC), and display resolutions (640×480 dots/640×400 dots/640×350 dots) discriminated on the basis of the polarity states by the mode discrimination/clock generator 15, and signal durations of the respective portions shown in FIGS. 3A through 3J at the corresponding display resolutions. Note that values in parentheses indicate those at the resolution of 640×350 dots. These values are constants set in the CRT controller 1, and are pre-stored in a BIOS (not shown). Furthermore, "H" and "D" in parentheses denote a Hsync period and a clock period, respectively, as shown in FIGS. 3B and 3G.

Figure 7B:
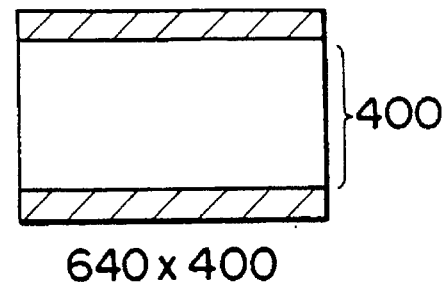
Figure 7C:
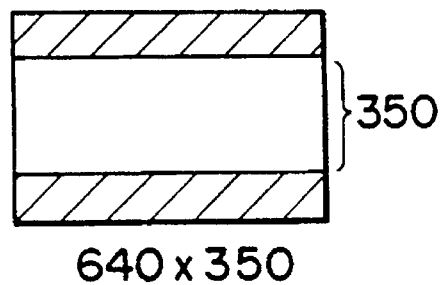

FIGS. 7A through 7C show the relationship of the display/ nondisplay areas at the corresponding display resolutions (640×480 dots/640×400 dots/640×350 dots). FIG. 7A corresponds to the resolution of 640×480 dots, FIG. 7B corresponds to the resolution of 640×400 dots, and FIG. 7C corresponds to the resolution of 640×350 dots. When the display resolution is lower than the physically maximum resolution on the display panel 19 such as 640×400 dots or 640×350 dots, display control is performed so that the display area is always located at the center of the screen. Note that hatched portions in FIGS. 7B and 7C represent non-display areas.

FIG. 8 is a detailed block diagram of the cathode timing generator 16.

In FIG. 8, a flip-flop (F/F) 21 outputs a generation timing signal 25 of the vertical shift clock (VSC) shown in FIG. 9D in accordance with the vertical sync signal (VSYNC) shown in FIG. 9B and the display period signal ($\overline{ENAB}$) shown in FIG. 9C. An AND gate 22 generates the vertical shift clock (VSC) shown in FIG. 9E in accordance with the signal 25 output from the F/F 21 and the horizontal sync signal (HSYNC) shown in FIG. 9A. A F/F 23 generates a timing signal 26 of the scanning data (SD) shown in FIG. 9F in accordance with the vertical sync signal (VSYNC) and the display period signal ($\overline{ENAB}$). A F/F 24 generates the scanning data (SD) shown in FIG. 9G in accordance with the signal 26 output from the F/F 23 and the vertical shift clock (VSC) output from the AND gate 22.

Note that the anode timing generator 12 has the same internal arrangement as that of the cathode timing generator 16 shown in FIG. 8, and can be realized by replacing the vertical sync signal (VSYNC) with the horizontal sync signal (HSYNC) and the horizontal sync signal (HSYNC) with the clock (CLK) in FIG. 8.

FIG. 10 shows another embodiment of the cathode timing generator 16. In the embodiment shown in FIG. 8, the vertical shift clock (VSC) and the scanning data (SD) are generated using the display period signal ($\overline{\text{ENAB}}$). In the embodiment shown in FIG. 10, a vertical shift clock (VSC) shown in FIG. 11E and scanning data (SD) shown in FIG. 11F are generated in accordance with a vertical sync signal (VSYNC) shown in FIG. 11B and a horizontal sync signal (HSYNC) shown in FIG. 11A.

In FIG. 10, a counter 31 generates a timing signal (FIG. 11C) for a display period in accordance with the vertical sync signal (VSYNC) and the horizontal sync signal (HSYNC). A F/F 32 extracts a timing signal of a first display period after generation of the vertical sync signal (VSYNC) from the signal 35 generated by the counter 31 and the vertical sync signal (VSYNC) so as to generate a timing signal 36 (FIG. 11D) for generating the vertical shift clock (VSC) and the scanning data (SD). An AND gate 33 generates the vertical shift clock (VSC) in accordance with the signal 36 generated by the F/F 32 and the horizontal sync signal (HSYNC). A F/F 34 generates the scanning data (SD) shown in FIG. 11F in accordance with the vertical shift clock (VSC) generated by the F/F 32.

FIGS. 12A through 12D are views for explaining a display position offset when no display period signal ($\overline{\text{ENAB}}$) is used. In FIG. 12A the horizontal sync signal (HSYNC) is normal, and in FIG. 12B the horizontal sync signal is shifted. Even if a display position is slightly offset on the screen of the CRT 5 due to the shifted horizontal sync signal (HSYNC) described above display data is not partially omitted (FIG. 13D). However, on the PDP 4, even if the display position is offset slightly, display data is partially omitted (FIG. 13C). In contrast to this, when the display period signal ($\overline{\text{ENAB}}$) is used, the effective display period is designated, and the effective display data can be synchronized with the display timing. Therefore, as shown in FIGS. 13E and 13F, the display position is not offset on the screen of the CRT 5, and data can always be displayed at a normal position.

Figure 13A:
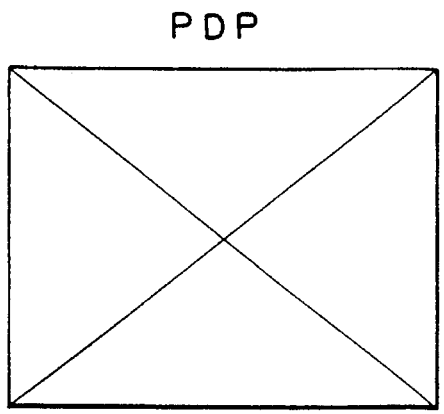
FIGS. 13A through 13F are views showing differences in display position offset states between arrangements with and without using the display period signal (ENAB).
Figure 13B:
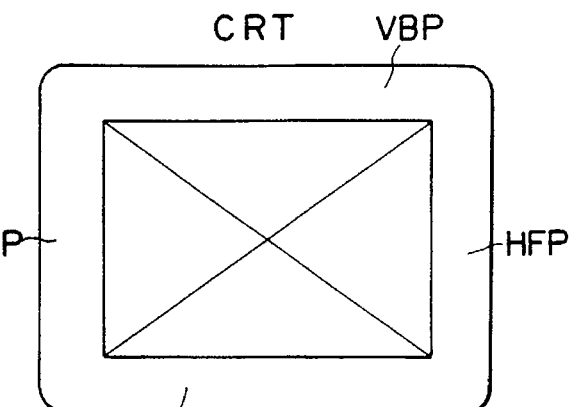
Figure 13C:
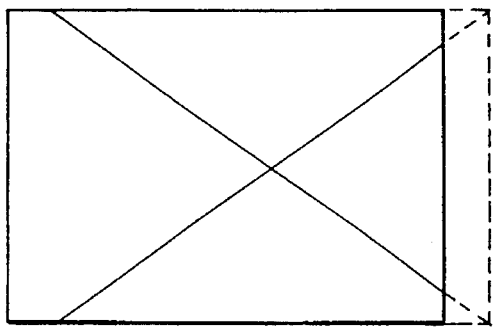
Figure 13D:
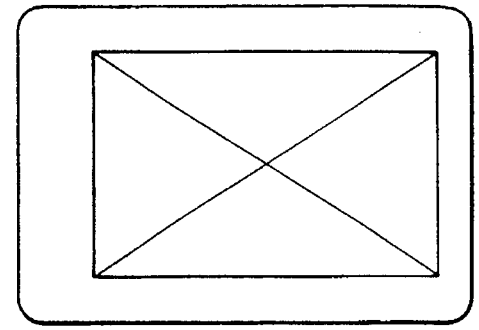
Figure 13E:
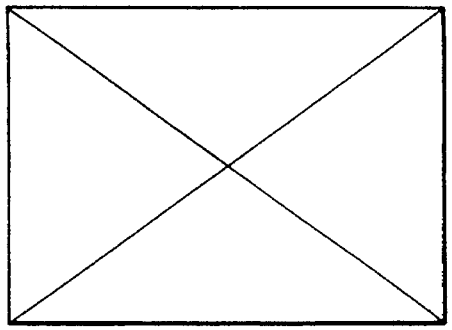
Figure 13F:
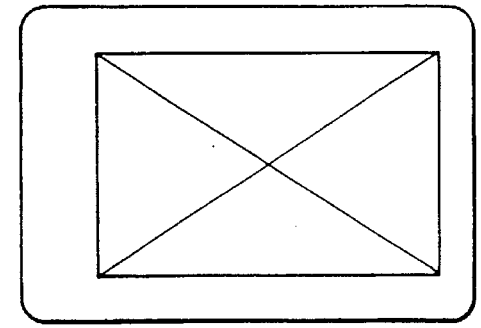

FIGS. 13A through 13F show differences in display position offset states between arrangements with and without using the display period signal ($\overline{\text{ENAB}}$). FIG. 13A shows a display state on the PDP 4 in a normal state, and FIG. 13B shows a display of the CRT 5 in a normal state, FIG. 13C shows a display state (a broken line portion indicates a portion corresponding to data omission) of the PDP 4 when a display position is offset due to the shifted horizontal sync signal (HSYNC) in an arrangement using no display period signal ($\overline{\text{ENAB}}$). FIG. 13D shows a display state of the CRT 5 under similar conditions. FIG. 13E shows a display state (free from display data omission) of the PDP when the display position is offset due to the shifted horizontal sync signal (HSYNC) in an arrangement using the display period signal ($\overline{\text{ENAB}}$), and FIG. 13F shows a display state of the CRT under similar conditions.

The operations of the first and second embodiments of the present invention will now be described with reference to FIGS. 1 through 13F.

The CRT controller 1 supplies the vertical sync signal (VSYNC), the horizontal sync signal (HSYNC), display data ($\overline{\text{DATA}}$), and the like, which are the display timing signals of the CRT 5, to the PDP 4 and the CRT 5 through the driver 3. In this case, the polarities (positive/negative) of the vertical sync signal VSYNC) and the horizontal sync signal (HSYNC) are changed in accordance with the display resolutions of the PDP 4 (640×480 dots/640×400 dots/640×350 dots) shown in FIGS. 7A through 7C, as shown in FIG. 6. In other words, the CRT controller 1 is designed to change the polarities of the signals HSYNC and VSYNC in accordance with the display resolutions of the PDP 4. Furthermore, the CRT controller 1 supplies the display period signal ($\overline{\text{ENAB}}$) for designating the effective display period of the display data ($\overline{\text{DATA}}$) to the PDP 4 through the driver 3. The clock module 2 supplies the clock signal CLK to the PDP 4 through the driver 3.

The PDP 4 receives the various signals generated as the display timings of the CRT 5, and drives the display panel 19 in accordance with these signals.

The display data ($\overline{\text{DATA}}$) (4 bits/pixel; 16 gradation levels) is sent to the anode driver 18 through the data buffer 11 as the gradation data (GD).

The anode timing generator 12 receives the clock (CLK), the display period signal ($\overline{\text{ENAB}}$), and the clock (MC) from the mode discrimination/clock generator 15, and generates the horizontal shift clock (HSC), the latch pulse (LP), and the like. The generator 12 outputs the generated signals to the anode driver 18.

The modulated pulse generator 13 generates the modulated pulse (MP) on the basis of the clock (MC) generated by the mode discrimination/clock generator 15, and outputs it to the anode driver 18. In this case, the pulse interval of the modulated pulse (MP) generated by the modulated pulse generator 13 can be used for uniform luminance adjustment over the entire gradation levels by the luminance adjustment variable resistor 14.

The mode discrimination/clock generator 15 discriminates the display resolution (FIG. 7) on the basis of the positive/negative polarities (FIG. 6) of the vertical sync signal (VSYNC) and the horizontal sync signal (VSYNC), and outputs the mode switching signal (MS). More specifically, when both the vertical sync signal (VSYNC) and the horizontal sync signal (HSYNC) have a negative polarity, the mode discrimination/clock generator 15 determines that the display resolution is 640×480 dots shown in FIG. 7B. When the vertical sync signal (VSYNC) has a positive polarity and the horizontal sync signal (HSYNC) has a negative polarity, the generator 15 determines that the display resolution is 640×400 dots shown in FIG. 7B. When the vertical sync signal (VSYNC) has a negative polarity and the horizontal sync signal (HSYNC) has a positive polarity, the generator 15 determines that the display resolution is 640×350 dots shown in FIG. 7C. The generator 15 supplies the mode switching signal (MS) to the cathode timing generator 16 together with the vertical sync signal (VSYNC) and the horizontal sync signal (HSYNC).

The cathode timing generator 16 receives the display period signal ($\overline{\text{ENAB}}$), the vertical sync signal (VSYNC), the horizontal sync signal (HSYNC), the mode switching signal (MS: 2 bits), which are output from the mode discrimination/clock generator 15, and generates signals, such as the scanning data (SD) (FIGS. 4C and 5C), the vertical shift clock (VSC) (FIGS. 4B and 5B), and the like, for driving the cathode electrodes of the display panel 19. The generator 16 supplies these signals to the cathode driver 17.

The cathode driver 17 receives the scanning data (SD) and the vertical shift clock (VSC) generated by the cathode timing generator 16, and outputs the cathode pulses (CAP0 through CAP479) (FIGS. 4D through 4G and FIGS. 5D through 5K) for driving the cathode electrodes.

FIG. 8 shows the internal arrangement of the cathode timing generator 16. Outputs Q of the F/Fs 21 and 23 go to low level, as shown in FIGS. 9D and 9F, in response to the trailing edge of the signal VSYNC shown in FIG. 9B. An output Q of the F/F 21 is input to one input of the AND gate 22. As a result, during a low-level period of the Q output of the F/F 21, the signal VSC is not generated, as shown in FIG. 9E. The signal $\overline{\text{ENAB}}$ shown in FIG. 9C is applied to CLK input terminals of the F/Fs 21 and 23. For this reason, the Q output of the F/F 23 goes to high level at the trailing edge of the signal $\overline{\text{ENAB}}$, as shown in FIG. 9F, and the Q output of the F/F 21 goes to high level at the trailing edge of the signal $\overline{\text{ENAB}}$, as shown in FIG. 9D. Since the Q output (high level) of the F/F 23 is applied to the CLK terminal of the F/F 24, the F/F 24 raises the signal SD, as shown in FIG. 9G. Since the Q output of the F/F 21 is input to one input of the AND gate 22, the signal VSC is generated, as shown in FIG. 9E. Since the high-level signal VSC is supplied to a CLR terminal of the F/F 24, the signal SD goes to low level, as shown in FIG. 9G. In this manner, the vertical blanking period and the effective display period are distinguished by the signal $\overline{\text{ENAB}}$, and display data (scanning data) can be extracted.

On the other hand, the anode driver 18 receives the gradation data (GD) from the data buffer 11, the horizontal shift clock (HSC) and the latch pulse (LP) from the anode timing generator 12, and the modulated pulse (MP) from the modulated pulse generator 13, fetches the gradation data (GD) in its internal shift register in response to the horizontal shift clock (HSC), latches data of 640 pixels in its internal latch circuit in response to the latch pulse (LP), and performs pulse-width control in accordance with the modulated pulse (MP) so as to output the anode pulses (ANP0 through ANP639) each having a pulse width corresponding to gradation of pixel data.

The display panel 19 receives the cathode pulses (CAP0 through CAP479) output from the cathode driver 17 at the cathode electrodes, also receives the anode pulses (ANP0 through ANP639) at the anode electrodes, and outputs display data at a maximum display resolution of 640×480 dots (16 gradation levels).

FIGS. 3A through 3J are timing charts showing timings of the various signals supplied to the PDP 4, and preset signal durations vary as shown in FIG. 6 in accordance with the corresponding display resolutions (640×480 dots/640×400 dots/640×350 dots).

FIGS. 4A through 4R show signal states of the respective portions in the PDP 4 at the display resolution of 640×480 dots (FIG. 7A), and FIGS. 5A through 5O show signal states of the respective portions in the PDP 4 at the display resolution of 640×400 dots (FIG. 7B) or 640×350 dots (FIG. 7C). Note that values in parentheses indicate those at the resolution of 640×350 dots. In FIGS. 5A through 5O, the vertical shift clock (VSC) having a shorter interval than a display area is generated for upper and lower non-display areas (hatched portions shown in FIGS. 7B and 7C) corresponding to 40 lines (or 65 lines) of the display screen, so that the operation timing of the display area is not suppressed. In this embodiment, each of the one-frame periods t1 of the display resolutions of 640×480 dots (FIG. 7B) and 640×350 dots (FIG. 7C) is shorter than the one-frame period t1 of the display resolution of 640×480 dots (FIG. 7A), as can be seen from FIG. 6. In this case, the one-frame period t1 at the display resolution of 640×480 dots corresponds to 60 frames per second, while the one-frame periods t1 at the display resolutions of 640×400 dots and 640×350 dots correspond to 70 frames per second each. This coincides with the display timing of the CRT 5.

The various constants shown in FIG. 6 are set so that a display area is always located at the center of the screen when the display resolution is lower than the physically maximum resolution on the display panel 19 like 640×400 dots or 640×350 dots.

FIG. 10 and FIGS. 11A through 11F respectively show the arrangement of the cathode timing generator according to another embodiment of the present invention, and its timing charts.

In this embodiment, no display period signal is used, and the vertical shift clock (VSC) and the scanning data (SD) are generated on the basis of the vertical sync signal (VSYNC) and the horizontal sync signal (HSYNC).

More specifically, the signal VSYNC shown in FIG. 11B is supplied to CLR terminals of counters 31 and 32, and the signal HSYNC shown in FIG. 11A is supplied to a CLK terminal of the counter 31 and is also input to one input of an AND gate 33. As a result, as shown in FIG. 11C, the output from the counter 31 goes to low level at the trailing edge of the signal VSYNC, and the counter 31 counts the signal HSYNC. When the counter 31 counts a predetermined count (the period t3 (vertical back porch) shown in FIG. 6, i.e., 32H (1H=32 msec) for 640×480 dots, 34H for 640×400 dots, and 59H for 640×350 dots), it supplies a carry signal to a CLK input terminal of the F/F 32. As a result, the Q output signal from the F/F 32 goes to low level at the trailing edge of the signal VSYNC, and goes to high level at the leading edge of the output from the counter 31, as shown in FIG. 11D. The high-level signal from the F/F 32 is supplied to the other input terminal of the AND gate 33 and a CLK input terminal of an F/F 34. As a result, as shown in FIG. 11F, the signal SD, the Q output of the F/F 34 goes to high level, the AND gate 33 outputs the signal VSC shown in FIG. 11E which is delayed by one period of the signal HSYNC, and the first clock of the signal VSC is supplied to the CLR terminal of the F/F 34. Therefore, the signal SD goes to low level, as shown in FIG. 11F. In this manner, the back porch period following the vertical sync signal is detected by the counter 31.

An offset of a display position when no display period signal (ENAB) is used will be described below with reference to FIGS. 12A through 12D and FIGS. 13A through 13F. When the horizontal sync signal (HSYNC) is shifted from the normal state shown in FIGS. 12A and 12B to a state shown in FIGS. 12C and 12D, display data is not partially omitted even if a display position is slightly offset on the screen of the CRT 5. (FIG. 13D). However, display data is partially omitted even if the display position is slightly offset on the screen of the PDP 4 (FIG. 13C). In contrast to this, when the signal period signal (ENAB) is used as in the embodiment described above, the effective display period can be designated, and the effective display data can be synchronized with the display timing. Therefore, as shown in FIGS. 13E and 13F, even if the display position is slightly offset on the screen of the CRT 5 (FIG. 13D), the display position is not offset on the screen of the PDP 4, and data can always be displayed at a normal position.

What is claimed is:

1. A display system provided with a flat panel display unit and adapted for connection with a cathode ray tube (CRT) display unit and for concurrently displaying a common image on both the flat panel display unit and the CRT, comprising:

a CRT controller for producing vertical and horizontal sync signals for controlling a display timing of the CRT display unit;

the flat panel display unit comprising:

display period setting means for setting a display period corresponding to a back porch period following the vertical sync signal; and means for sending image data, in synchronism with the vertical and horizontal sync signals, to the flat panel display unit during the display period, thereby to display image data at a position of the flat panel display unit determined by the display period in synchronism with the vertical and horizontal sync signals while concurrently displaying the image data on the CRT display unit.

2. The display system according to claim 1, wherein the flat panel display unit and CRT controller have different resolutions; the CRT controller produces the vertical and horizontal sync signals with different polarities corresponding to the different resolutions; and the display period setting means includes means for producing the display period signal in response to the resolution of the flat panel display unit.

3. The system according to claim 1, wherein the display period setting means comprises a counter for receiving the vertical and horizontal sync signals to produce a timing signal representing a display period.

4. A display system provided with a flat panel display unit and adapted for connection with a cathode ray tube (CRT) display unit and for concurrently displaying a common image on both the flat panel display unit and the CRT, comprising:

a CRT controller for producing a vertical sync signal, a horizontal sync signal, and a display control signal that distinguishes a vertical blanking period from a display period, the vertical blanking period including a vertical sync signal period and a back porch period following the vertical sync signal period;

the flat panel display unit comprising:

display period setting means, responsive to the vertical sync signal, to the horizontal sync signal, and to the display control signal output from the CRT controller, for producing a display period signal for the flat panel display unit; and means for sending image data, in synchronism with the vertical and horizontal sync signals, to the flat panel display unit during the display period, thereby to display image data at a position of the flat panel display unit determined by the display period in synchronism with the vertical and horizontal sync signals while concurrently displaying the image data on the CRT display unit.

5. The display system according to claim 4, wherein the flat panel display unit and CRT controller have different resolutions; the CRT controller produces the vertical and horizontal sync signals with different polarities corresponding to the different resolutions; and the display period setting means includes means for producing the display period signal in response to the resolution of the flat panel display unit.

6. The system according to claim 4, wherein the display period setting means comprises a cathode timing generator for receiving the display control signal from the CRT controller and the vertical and horizontal sync signals and for outputting scanning data and vertical shift clock signals for driving cathode electrodes.

7. A display control method for a display system provided with a flat panel display unit and adapted for connection with a cathode ray tube (CRT) display unit, and having a CRT controller for producing vertical and horizontal sync signals for controlling the display timing of the CRT display unit, the method being adapted for concurrently displaying a common image on both the flat panel display unit and the CRT, the method comprising the steps of:

determining a display period corresponding to a back porch period following the vertical sync signal; and sending image data, in synchronism with the vertical and horizontal sync signal, to the flat panel display unit during the display period, thereby to display image data at a position of the flat panel display unit determined by the display period in synchronism with the vertical and horizontal sync signals while concurrently displaying the image data on the CRT display unit.

8. The method according to claim 7, wherein the display period determining step produces the display period in response to the polarities of the vertical and horizontal sync signals output from the CRT controller which correspond to different resolutions of the flat panel display unit.

9. A display control method for a display system provided with a flat panel display unit and adapted for connection with a cathode ray tube (CRT) display unit, and having a CRT controller for producing a vertical sync signal, a horizontal sync signal, and a display control signal corresponding to a back porch period following the vertical sync signal, the vertical blanking period including a vertical sync signal period and a back porch period following the vertical sync signal period, the method being adapted for concurrently displaying a common image on both the flat panel display unit and the CRT, the method comprising the steps of:

determining a display period for the flat panel display unit based upon the vertical sync signal, the horizontal sync signal, and the display control signal; and sending image data, in synchronism with the vertical and horizontal sync signals, to the flat panel display unit during the display period, thereby to display image data at a position of the flat panel-display unit determined by the display period in synchronism with the vertical and horizontal sync signals while concurrently displaying the image data on the CRT display unit.

10. The method according to claim 9, wherein the determining step produces the display period in response to the polarities of the vertical and horizontal sync signals output from the CRT controller which correspond to different resolutions of the flat panel display unit.

11. A system adapted for coupling to a cathode ray tube, the system comprising:

a flat panel display unit including a flat panel display having one of a plurality of resolutions; and means for controlling the cathode ray tube, including means for generating a vertical sync signal having a first polarity determined in accordance with which one of the plurality of resolutions is in effect on the flat panel display, and a plurality of rising edges, and means for generating a horizontal sync signal having a second polarity determined in accordance with which one of the plurality of resolutions is in effect on the flat panel display, and for applying the horizontal sync signal to the cathode ray tube, the horizontal sync signal having a first number of rising edges per rising edge of the vertical sync signal, and wherein the flat panel display unit further includes means for generating a shift clock signal by gating the horizontal sync signal, the shift clock signal having a second number of rising edges per rising edge of the vertical sync signal, the second number being less than the first number by a difference determined by the first and second polarities; and means for applying the shift clock signal to the flat panel display, to display an image at a position determined by the shift clock signal.

12. The system of claim 11, wherein the means for generating a shift clock signal includes means for counting rising edges of the horizontal sync signal.

13. The system of claim 11, wherein the means for generating a shift clock signal includes means for disabling generation of the shift clock signal until an occurrence of a third number of rising edges of the horizontal sync following an edge of the vertical sync signal, the third number being greater than 30.

* * * * *